Patented Aug. 12, 1947

2,425,376

UNITED STATES PATENT OFFICE 2,425,376

GUANIDINE DERIVATIVES AND METHOD OF PREPARING THE SAME

Samuel Kushner, Montvale, N. J., and Louis Brancone, Pearl River, N. Y., assignors, by mesne assignments, to American Cyanamid Company, New York, N. Y., a corporation of Maine No Drawing. Application June 14, 1945, Serial No. 599,520

8 Claims. (Cl. 260—391)

The present invention relates to new organic compounds. More particularly, it relates to guanidine derivatives of triphenylmethanes and to methods of preparing the same.

In accordance with the present invention, new guanidine triphenylmethanes can be obtained having the following general formula:

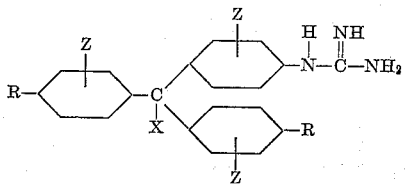

wherein R is a member of the group consisting of amino and guanidine radicals, X is a member of the group consisting of hydrogen and hydroxy radicals, and Z is a member of the group consisting of hydrogen and alkyl radicals.

We prepare the compounds of the present invention by heating a triamino substituted triphenyl methane acid salt with cyanamide.

The compounds prepared by methods of the present invention are white solids when X in the general formula is hydrogen. They are pink to reddish solids when X in the general formula is a hydroxy radical. They are slightly soluble in water and are soluble in methanol, ethanol, and other hydroxylated solvents.

We prefer to use as an intermediate reduced fuchsin base which we prepare from basic fuchsin by treatment with hydrochloric acid and zinc dust as shown in the specific examples. Other triamino triphenyl methanes having one or more alkyl groups attached to the phenyl radicals can be used as intermediates, as well as triamino triphenyl methane itself.

In preparing the compounds of the present invention an acid salt of the triamino triphenyl methane used as an intermediate is first prepared by the addition of sufficient acid. The water and excess acid are removed. The acid salt is then suspended in an anhydrous solvent such as absolute ethanol. Cyanamide is added and the mixture is heated until the reaction is complete. The proportion of cyanamide to intermediate determines the type of compound prepared. When one molecular equivalent of cyanamide is added to one equivalent of intermediate, a mono guanidine derivative is obtained. When two equivalents of cyanamide are reacted with one equivalent of intermediate, a diguanidine is obtained, etc.

In carrying out the reaction of the present invention, we can use a temperature of from about 60° to about 120° C. The reaction is usually complete in from about 6 hours to about 36 hours. A convenient method and one which we prefer is to heat the reactants in a solvent at refluxing temperatures until the reaction is complete, usually within about 8 to 16 hours.

When the reaction is completed, the solvent is removed and the residue is dissolved in water. We prefer to recover the product from the aqueous solution as a salt, such as the carbonate, by the addition of a metallic carbonate to the solution. If the base is desired, the salt may be neutralized with an acid to obtain the base.

In order that the nature of the invention may become more apparent, the following compounds are among those that may be prepared by the process described herein and are listed as falling within the scope of the present invention: 4,4'-diamino diphenyl-4''-guanidine tolyl methane, 4-aminophenyl - 4' - aminotolyl - 4'' - guanidine phenyl methane, 4,4'-diamino diphenyl-4''-guanidine tolyl carbinol, 4-aminophenyl-4',4''-diguanidine phenyl tolyl methane, 4-aminotolyl-4',4''-diguanidine diphenyl methane, 4-aminophenyl-4',4''-diguanidine phenyl tolyl carbinol, 4,4'4'' - triguanidine diphenyl tolylmethane, 4,4',4'' - triguanidine diphenyl tolylcarbinol, 4,4',4'' - triguanidine phenyl ditolylmethane, 4,4',4'' - triguanidine phenyl ditolylcarbinol, 4,4',4''-triguanidine tritolylmethane, 4,4',4''-triguanidine tritolylcarbinol, and the like.

These compounds are useful as chemotherapeutic agents and in the manufacture of pharmaceuticals.

The following specific examples show the preparation of reduced fuchsin base and the use of this intermediate in the preparation of polyguanidine triphenyl methanes.

*Example 1*

Twenty-five grams of fuchsin was dissolved in 80 cc. of water to which was added with shaking 80 cc. of 13 N-hydrochloric acid together with small portions of zinc dust. The mixture was heated on a steam bath. When enough zinc had been added to effect reduction, the solution was filtered through diatomaceous earth. The solution was treated with five times its volume of concentrated hydrochloric acid. The precipitated trihydrochloride was cooled and filtered. The hydrochloride was dissolved in a minimum of warm water, and the precipitation procedure repeated. After repeating this procedure a third time, the solid was dissolved in a minimum of water, treated with activated carbon and filtered. It was added in small portions to a 50% iced solution of potassium hydroxide. The solid was filtered and dried. It was then crushed, heated in a minimum of water, and filtered. The reduced fuchsin base, washed thoroughly and dried, weighed 15.2 g.

One-half gram of reduced fuchsin base was dissolved in 10.5 cc. of 0.5 N alcoholic hydrochloric acid. To the solution was added 0.145 g. of cyanamide, and the resulting solution was refluxed overnight. The alcohol was removed and the pink solid was dissolved in water and the solution treated with activated carbon and filtered. One gram of potassium carbonate in 5 cc. of water was added. A white solid came down immediately, which was filtered. A yield of 310 mgm. of 4 - amino - phenyl - 4',4'' - diguanidine phenyl tolyl methane carbonate, having a melting point of 51 to 55° C., was obtained. Analytical values for carbon, hydrogen, and nitrogen checked closely with theoretical.

In place of hydrochloric acid in the above example, we can use hydrobromic acid which would form the trihydrobromide of reduced fuchsine base.

Example 2

To 8.0 g. of reduced fuchsin base dissolved in 13.2 cc. of 4 N hydrochloric acid was added 2.217 g. of cyanamide, and the resulting solution was refluxed overnight. The reaction mixture was diluted slightly with water and treated with activated carbon and filtered. On treatment with a saturated solution of potassium carbonate, a white solid came down immediately and was filtered off. A yield of 10.45 g. of 4-amino phenyl-4',4''-diguanidine phenyl tolyl methane mono carbonate was obtained.

Example 3

To 5 grams of 4-amino phenyl, 4',4''-diguanidine phenyl tolyl methane dissolved in 18.7 cc. of 1.2 N hydrochloric acid was added 2.2 cc. of 13 N hydrochloric acid in 70 cc. of water. Then 2.7 cc. of glacial acetic acid was added and the solution cooled to 10° C. A suspension of 4.4 g. of lead peroxide in 16 cc. of water was added, causing a reddish color to develop. The mixture was allowed to stand in the ice bath for 8 minutes and then at room temperature for 12.5 minutes with occasional stirring. To the mixture was added 2.4 g. of anhydrous sodium sulfate in 20 cc. of water. This was filtered, and then poured into excess 50% potassium carbonate. The tan solid was filtered off and washed with an abundance of water to remove all the inorganic salts. The precipitate was dried in a vacuum desiccator. A yield of 2.0 g. of 4-amino phenyl, 4',4''-diguanidine phenyl tolyl carbinol was obtained.

Example 4

To 35 cc. of 6 N hydrochloric acid was added 8 g. of 4,4',4''-triamino diphenyl tolyl methane to form the trihydrochloride. The reaction mixture was evaporated to dryness with a vacuum pump. The residue was dissolved in absolute alcohol and to it was added 16 g. of cyanamide. The solution was refluxed overnight and was then evaporated to dryness. The solid obtained was dissolved in water to which was added an excess of saturated potassium carbonate solution. The precipitate formed was collected, dried, and dissolved in 10% hydrochloric acid, followed by reprecipitation with potassium carbonate solution. The solid when dried and analyzed proved to be 4,4',4'''-triguanidine diphenyl tolyl methane carbonate. The yield was 9.0 g.

Example 5

One gram of 4,4',4''-triamino diphenyl tolyl methane trihydrochloride (prepared by mixing reduced fuchsin base with hydrochloric acid) was dissolved in 15 cc. of absolute alcohol. To it was added 1.512 g. of cyanamide and the mixture refluxed overnight on a steam bath. The alcohol was then removed, and the resulting solid was dissolved in water and filtered. The filtrate was treated with potassium carbonate solution and a pinkish precipitate settled out. The product was collected on a filter and dried. A yield of 0.49 g. of 4,4',4''-triguanidine diphenyl tolyl methane carbonate was obtained.

We claim:

1. Chemical compounds having the following formula:

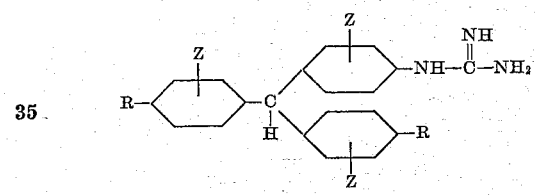

wherein R is a member of the group consisting of amino radicals and guanido radicals, and Z is a member of the group consisting of hydrogen and methyl radicals.

2. 4,4'-diamino - 3''-methyl - 4'' - guanido triphenyl methane.

3. 4-amino-4',4'' - diguanido - 3'' - methyl triphenyl methane.

4. 4,4',4'' - triguanido - 3'' - methyl triphenyl methane.

5. A method of preparing compounds having the formula:

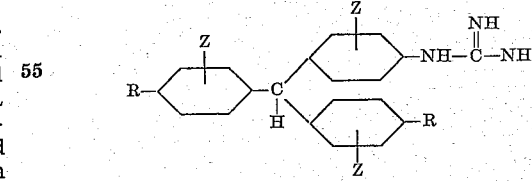

wherein R is a member of the group consisting of amino radicals and guanido radicals, and Z is a member of the group consisting of hydrogen and methyl radicals which comprises heating an acid salt of a compound having the formula:

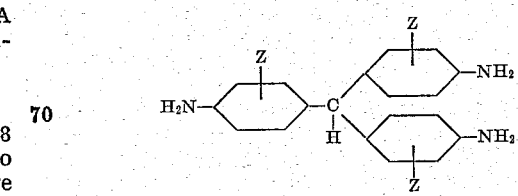

wherein Z is as defined above, with cyanamide.

6. A method of preparing a compound having the formula:

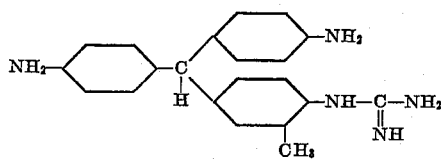

which comprises heating together an acid salt of 4,4',4''-triamino-3''-methyl triphenyl-methane and one mol of cyanamide in a solvent.

7. A method of preparing a compound having the formula:

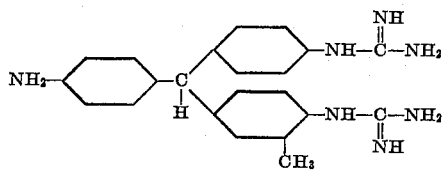

which comprises heating together an acid salt of 4,4',4''-triamino - 3'' - methyl triphenyl methane and two mols of cyanamide in a solvent.

8. A method of preparing a compound having the formula:

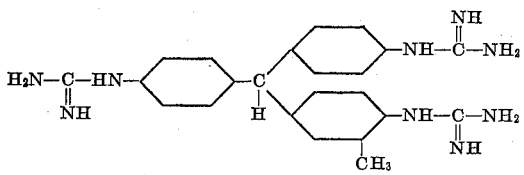

which comprises heating together an acid salt of 4,4',4''-triamino - 3'' - methyl triphenyl methane and at least 3 mols of cyanamide in a solvent.

SAMUEL KUSHNER.
LOUIS BRANCONE.

REFERENCES CITED

The following references are of record in the file of this patent:

Mayer—"Journal für praktische Chemie," vol. 196 (new series, vol 88), pages 699 to 730 (1913).